(12) United States Patent
Chang et al.

(10) Patent No.: US 7,503,031 B2
(45) Date of Patent: Mar. 10, 2009

(54) METHOD OF TRANSFORMING AN APPLICATION INTO AN ON-DEMAND SERVICE

(75) Inventors: Kyusun Chang, Austin, TX (US); Jagadish Dasari, Austin, TX (US); Hari Haranath Madduri, Austin, TX (US); Alfredo V. Mendoza, Georgetown, TX (US); John Alan Mims, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 10/782,500

(22) Filed: Feb. 19, 2004

(65) Prior Publication Data

US 2005/0188345 A1    Aug. 25, 2005

(51) Int. Cl.
*G06F 9/44* (2006.01)
*G06F 9/45* (2006.01)

(52) U.S. Cl. .................. 717/101; 717/102; 717/103; 717/137

(58) Field of Classification Search ......... 717/100–103, 717/120–123, 136, 168–178, 137; 705/7–45
See application file for complete search history.

(56) References Cited

U.S. PATENT DOCUMENTS

| | | | | |
|---|---|---|---|---|
| 5,321,610 A * | 6/1994 | Breslin | .................... | 705/9 |
| 5,752,042 A * | 5/1998 | Cole et al. | ................... | 717/173 |
| 5,909,545 A * | 6/1999 | Frese et al. | ................. | 709/208 |
| 6,067,582 A * | 5/2000 | Smith et al. | ................. | 717/177 |
| 6,151,643 A * | 11/2000 | Cheng et al. | .................. | 710/36 |
| 6,298,386 B1 | 10/2001 | Vahalia et al. | | |
| 6,324,578 B1 | 11/2001 | Cox et al. | | |
| 6,374,336 B1 | 4/2002 | Peters et al. | | |
| 6,381,610 B1 * | 4/2002 | Gundewar et al. | ....... | 707/104.1 |
| 6,418,554 B1 | 7/2002 | Delo et al. | | |
| 6,418,557 B1 | 7/2002 | Otani | | |
| 6,523,166 B1 * | 2/2003 | Mishra et al. | ............... | 717/174 |
| 6,611,498 B1 | 8/2003 | Baker et al. | | |
| 6,684,191 B1 * | 1/2004 | Barnard et al. | ................. | 705/7 |
| 7,287,228 B2 * | 10/2007 | Kundu et al. | ................ | 715/745 |
| 2005/0044197 A1 * | 2/2005 | Lai | ........................... | 709/223 |
| 2005/0125510 A1 * | 6/2005 | Kundu et al. | ................ | 709/220 |

* cited by examiner

*Primary Examiner*—Lewis A. Bullock, Jr.
*Assistant Examiner*—Jason Mitchell
(74) *Attorney, Agent, or Firm*—Stephen J. Walder, Jr.; David A. Mims, Jr.

(57) ABSTRACT

An example of a solution provided here comprises assessing readiness for transformation, based on a number of desirable application attributes; planning development work (which may involve mapping desirable application attributes to kinds of help); generating a proposal for transformation, and outputting the proposal.

14 Claims, 7 Drawing Sheets

STAGE 1 CHECKLIST — 400

| | ARCHITECTURAL CONSULTING | DEVELOPMENT CONSULTING | HOSTING CONSULTING | AEP CONSULTING | TECHNOLOGY EDUCATION | OTHERS |
|---|---|---|---|---|---|---|
| SUITABILITY TO BE HOSTED | | | | X | | |
| ON-DEMAND INFRASTRUCTURE USE | | | | | | |
| AUTO-PROVISIONING PACKAGING | | | | | | |
| MULTI-TENANCY | X | X | | | | |
| SOFTWARE MAINTENANCE | | | | | | |
| SCALABILITY | | | | | | |

Columns: 407, 408, 409, 410, 411, 412
Rows: 401, 402, 403, 404, 405, 406

FIG. 4

STAGE 2 CHECKLIST

|  | ARCHITECTURAL CONSULTING | DEVELOPMENT CONSULTING | HOSTING CONSULTING | AEP CONSULTING | TECHNOLOGY EDUCATION | OTHERS |
|---|---|---|---|---|---|---|
| APPLICATION METERING | | | | | | |
| APPLICATION BILLING | | | | | | |
| PORTAL | | | | | | |
| USER PROVISIONING | | | | | | |
| APPLICATION PROVISIONING | | | | | | |
| CUSTOMER CARE | | | | | | |
| SOA ARCHITECTURE | | | | | | |
| VIRTUALIZED RESOURCES | | | | | | |

FIG. 5

STAGE 3 CHECKLIST — 600

| | ARCHITECTURAL CONSULTING | DEVELOPMENT CONSULTING | HOSTING CONSULTING | AEP CONSULTING | TECHNOLOGY EDUCATION | OTHERS |
|---|---|---|---|---|---|---|
| SINGLE SIGN-ON | | | | | | |
| APPLICATION SELF-MONITORING | | | | | | |
| LICENSE AGREEMENTS | | | | | | |
| SERVICE LEVEL AGREEMENTS | | | | | | |
| TRIAL SUBSCRIPTIONS | | | | | | |
| RESOURCE PROVISIONING | | | | | | |
| USER/ENTERPRISE QUALIFICATIONS | | | | | | |
| OFFER CATALOG | | | | | | |

FIG. 6

METHOD OF TRANSFORMING AN APPLICATION INTO AN ON-DEMAND SERVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling, and more particularly to software development, installation, and management (e.g. handling information that is usable in transforming an application).

BACKGROUND OF THE INVENTION

Software vendors, who offer their applications as traditional licensed software products, are under pressure from customers who desire applications that are less expensive, and less complex to install and use. Thus there is a need for methods and systems of transforming an application into a more desirable product, and particularly into an on-demand service.

SUMMARY OF THE INVENTION

An example of a solution to problems mentioned above comprises assessing readiness for transformation, based on a number of desirable application attributes; planning development work (which may involve mapping desirable application attributes to kinds of help); generating a proposal for transformation, and outputting the proposal.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

FIG. 4 illustrates an example of a checklist, containing attributes for Stage 1.

FIG. 5 illustrates an example of a checklist, containing attributes for Stage 2.

FIG. 6 illustrates an example of a checklist, containing attributes for Stage 3.

DETAILED DESCRIPTION

The examples that follow involve the use of one or more computers and may involve the use of one or more communications networks. The present invention is not limited as to the type of computer on which it runs, and not limited as to the type of network used.

The following are definitions of terms used in the description of the present invention and in the claims:

"Application" means any specific use for computer technology, or any software that allows a specific use for computer technology.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Mapping" means associating, matching or correlating.

"On-demand service" means any application made accessible via a network, such that the user or application provider pays only for resources used, or such that resources can shrink and grow depending on the demands of the application.

"Output" or "Outputting" means producing, transmitting, or turning out in some manner, including but not limited to printing on paper, or displaying on a screen, writing to a disk, or using an audio device.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

"Transformation" means customizing an application or converting an application for hosting in a different environment, or for a different kind of use.

Figure 1:
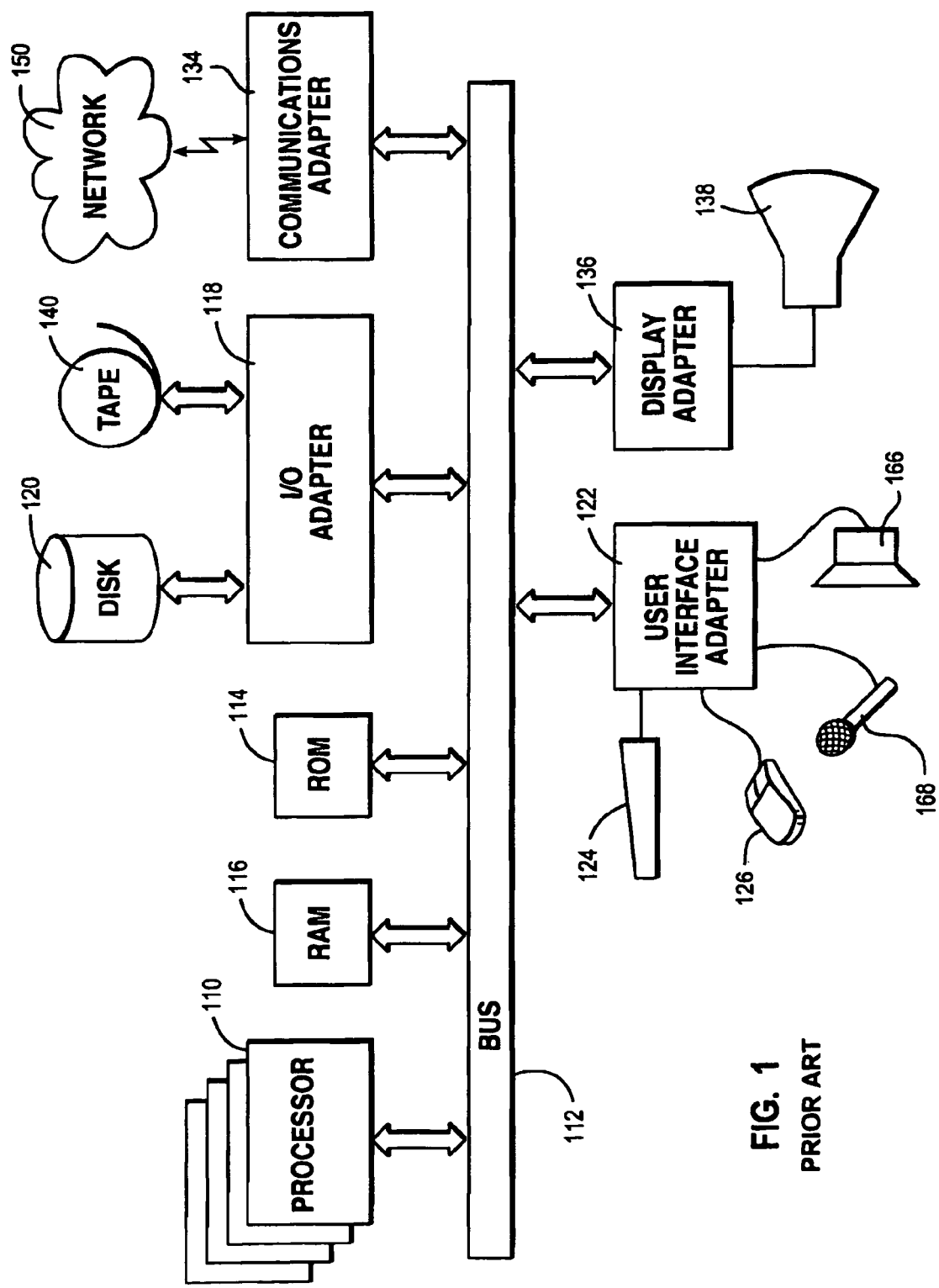
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, personal computers, workstations, servers, and mainframes. For example, the invention may be implemented as an automated consulting tool running on personal computers or web servers, or the invention may be implemented as an on-demand service that is a completed transformation project, running on servers or mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
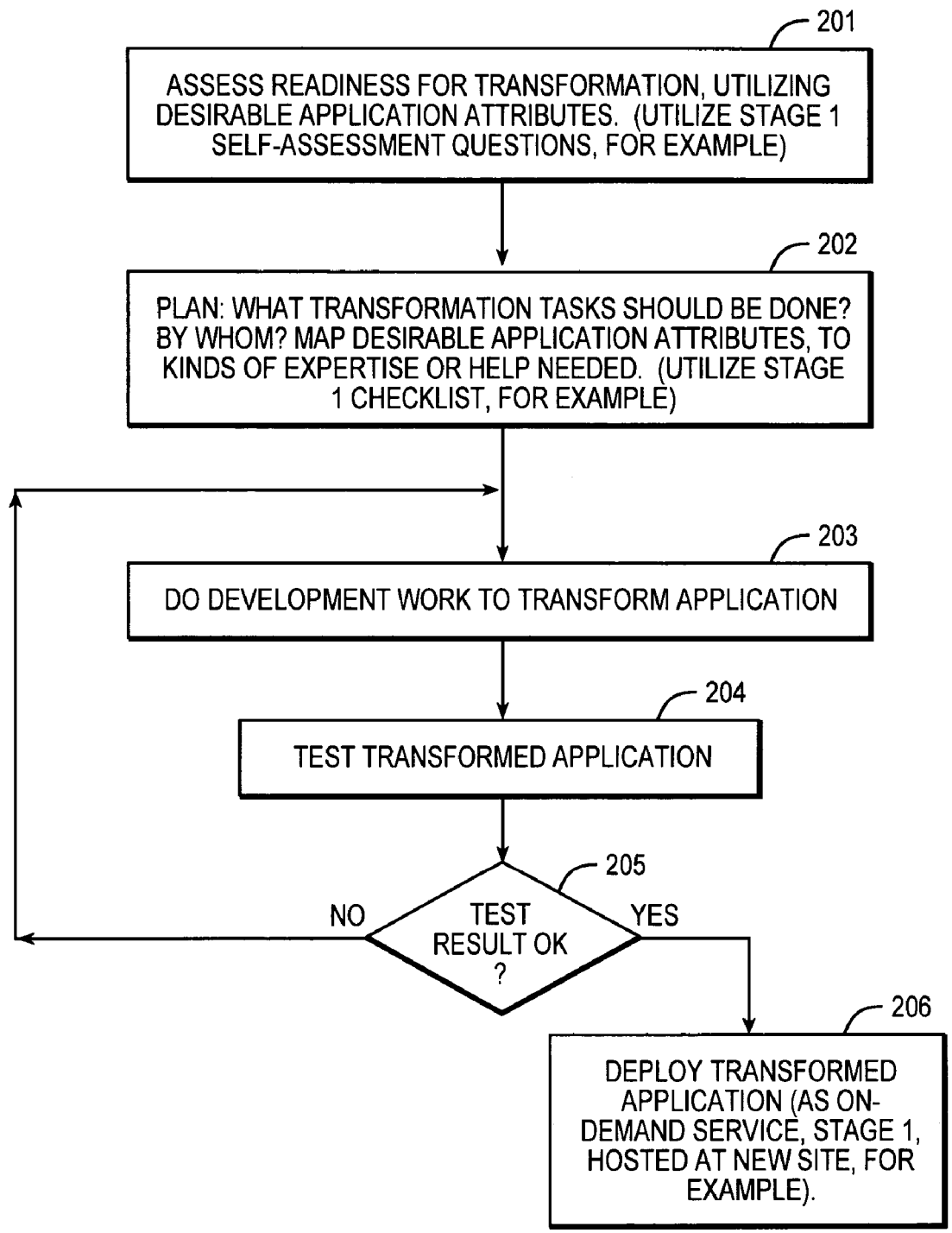
FIG. 2 is a high-level flow chart illustrating an example of a method of transforming an application, and deploying it.

FIG. 2 is a high-level flow chart illustrating an example of a method of transforming an application, and deploying it as an "on-demand service" (ODS), an application made accessible via a network, such that the user or application provider pays only for resources it uses, or such that resources can shrink and grow depending on the demands of the application. FIGS. 2-7 illustrate scenarios and examples of how to use the method. The method helps application owners transform their applications into an ODS. This may be hosted in IBM's utility hosting center, for example. Assessment (Block 201) involves the design considerations, or desirable application attributes, that an application owner needs to be aware of so he can plan (Block 202) for transformation. The method and system helps the application owner decide (Block 202) which expert help he already has and which help he will need to get externally. It is up to the application owner to decide which attributes are really needed for this application. Implementation (Blocks 203-206) may involve implementing all of the desirable application attributes (introduced at Block 201), and this is the best way to reap the benefits of being an ODS. Implementing some of the attributes is also a practical option.

Turning to some details of FIG. 2, Block 201 involves assessing readiness for transformation, based on desirable application attributes (utilizing stage 1 self-assessment questions, for example). In the following examples, the application owner or Independent Software Vendor (ISV) is presented with a series of questions answerable by a yes or no. At the end of each topic, the ISV can assess their application as 1) ready, 2) almost ready or 3) not ready, concerning that particular attribute. The objective of the questions is to help the ISV assess his application for hosting readiness as an ODS. Multi-tier scalability, multi-tenancy and metered-usage are a few attributes that applications need to have to be successful in the on-demand hosting environment. The successful ODS requires several attributes in order to fully exploit the utility environment. Transforming an existing, non-utility application into an ODS is not a trivial matter. Most traditional applications are created and sold as a licensed product to a dedicated enterprise customer. Block 201 introduces the attributes needed by an ODS. They are classified according the their suggested stages of implementation. The classification begins at stage one and goes up to stage three. These stages are meant to provide guidance to the application owner as to which attributes, when implemented, will help the application reap the full benefits of the utility infrastructure as well as provide a sustainable quality of service in an on demand environment.

Block 202 represents planning development work. Planning may include mapping desirable application attributes, to kinds of expertise or help needed. (utilizing a stage 1 checklist, for example). At Block 202, a detailed plan or proposal for transformation may be produced.

Block 203 represents employing the appropriate kinds of expertise or help, to do development work to transform application. For example, to help ISV's transform their applications to be responsive to demand, IBM's hosting infrastructure offers a set of utility services that are available to the application developer. (See also the description of FIG. 7). These pre-integrated common services can provide a proven solution that ISV'S can just plug into their application without having to spend time developing such non-trivial functionality. For example, an ODS needs to meter usage and bill the subscribers of the application. Using IBM's metering/billing common service enables ISV'S to plug this solution into their applications, and eliminates the need to write and develop their own functions for metering and billing. This allows the software developer to concentrate on their core competencies of developing business and application functionality.

After testing at Block 204 yields acceptable results at 205, the transformed application may be deployed. Block 206 represents deploying the transformed application (e.g. as an on-demand service, stage 1, hosted at new site). IBM's on-demand hosting, for example, provides the application owner an environment that dynamically shrinks and grows as demand dictates. It mitigates the risk of economic uncertainty to the application provider. All up front costs for the infrastructure are taken care of by the Infrastructure Service Provider, such as IBM. Infrastructure cost is lowered through higher server utilization and shared services.

At Block 206, desirable application attributes may be implemented in stages. Stage one attributes are attributes that are required by the hosting infrastructure, or attributes that provide a sustainable and acceptable quality of service. Stage two attributes are classified as strategic and are targeted for evolution and growth of the ODS. They are needed to make the ODS more user friendly for administrators and subscribers. As the ODS becomes more popular manageability of subscribers become an issue. Use of the application needs to be monitored to prevent abuse. And a more sophisticated billing system needs to be implemented. As such, these attributes will need to be implemented before such problems occur; within four to eight months of ODS availability. Stage three attributes are classified as evolution for future technologies. With sustainable quality of service in mind, stage three attributes aim to contribute to the robustness of the application; use of grid technology and autonomic behavior fall under this category. Suggested implementation time frame is from twelve months and beyond after the ODS first becomes available.

Figure 3:
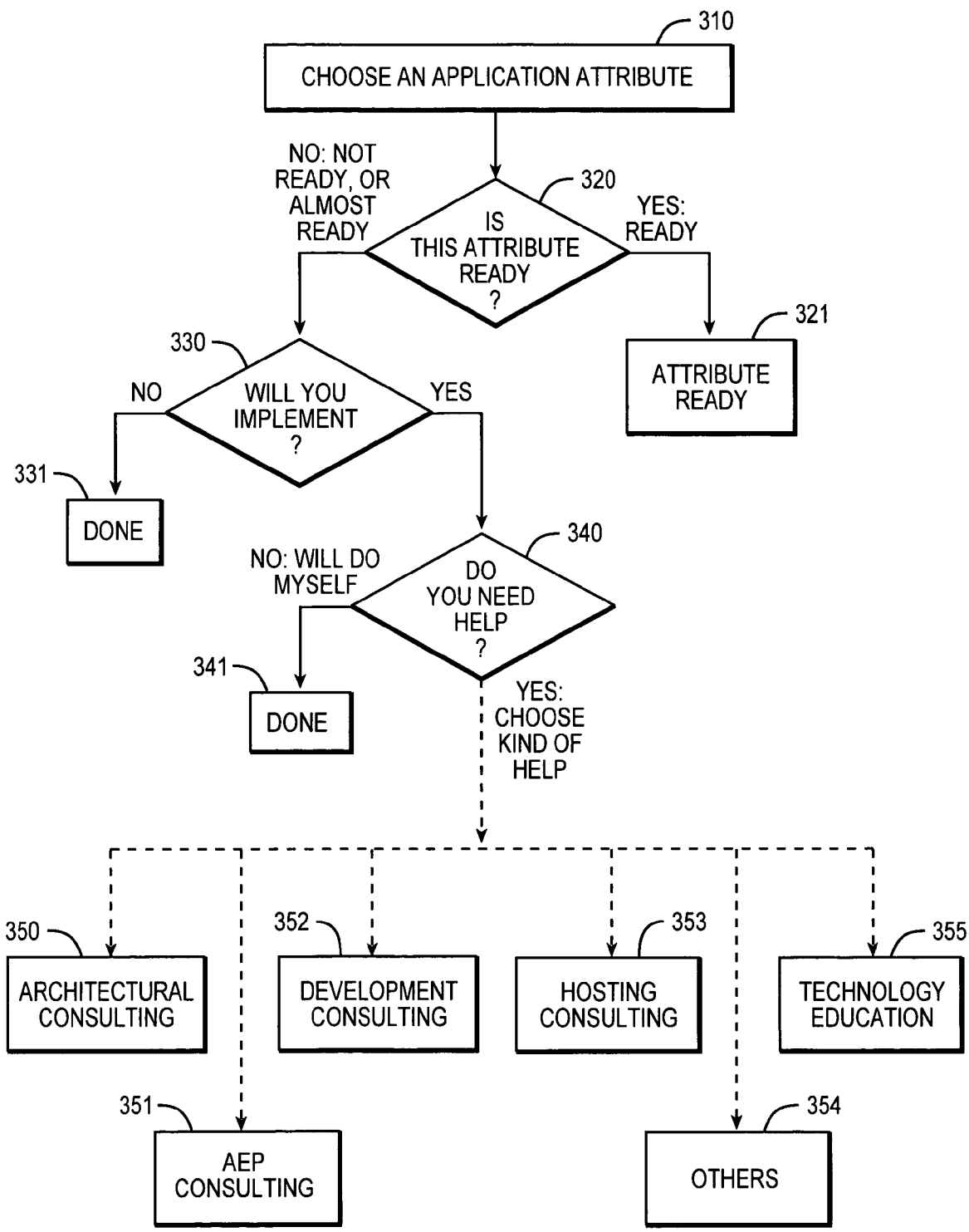
FIG. 3 is a flow chart illustrating another example of a method of transforming an application.

FIG. 3 is a flow chart illustrating another example of a method of transforming an application. As an overview, this example begins with providing a set of desirable application attributes, and providing an iterative process, including Block 310 and Decisions 320-340. This example involves a user choosing (310) a desirable application attribute from the set, assessing readiness for transformation (Decision 320), planning development work (Decisions 330-340), and repeating these steps for a number of desirable application attributes chosen from the set. Executing the iterative process may generate a detailed plan or proposal for transformation.

Turning to some details of FIG. 3, consider a scenario involving a hypothetical company named Ideas2Concepts.com, that provides software consulting services. The company develops a Web application to track time spent on projects by its consultants. The application is available 24 hours per day and is accessible from anywhere that has an Internet connection. With the application, the company bills their clients more accurately and in a timely manner. They add an invoice creation function that sends invoices directly to clients via the Internet or through the Postal Service. Ideas2Concepts.com develops their home-grown application into a packaged and licensed product for other companies to use. The application grows in terms of features, and evolves into an enterprise-ready application that is more complicated to install and run.

Many customers need such an application, that can be customized to their needs, and one that is affordable, with a good return on investment (ROI). After an initial meeting with IBM's Application Enablement Program consultants, Ideas2Concepts.com's application architects, as well as their upper management, agree to transform their application, so that it can be hosted and sold to smaller customers as a service. The transformed application will also be modularized so that customers who use the application can pay for only what they need or for what they use.

Ideas2Concepts.com architects start by utilizing the method illustrated in FIG. 3. Starting at Block 310 and Decision 320 of FIG. 3, Ideas2Concepts.com architects go through a set of self-assessment questions for each desirable application attribute. There is a brief description for each attribute. The questions bring other details related to the attribute to the application architects' attention. The architects read the description and answer questions for the first attribute, "Suitability for hosting." Consider the following example questions and answers:

File Backup

Q: Can you identify critical files that need to be backed up? A: X Yes No

Remote Administration

Q: Can the application be remotely administered? A: Yes X No

Security for Internet

Q: Does the application have enough security to be delivered on the Internet? A: X Yes No Here are the explanations for the answers in the example above, concerning suitability for hosting:

File Backup

In the above example, the architects already know what essential files to back up in case of a catastrophe. So in this case the architect checks "Yes."

Remote Administration

The application does not have the capability to be administered remotely since this is a stand-alone application installed in a customer premise. So in this case the architect checks "No."

Security for Internet

Since the product is already Web based, it is understandable that the designers of the application designed it with encryption technology for Internet access. So the architect answers "Yes" to this question.

At this point (Decision 320 of FIG. 3) the remote administration issue is brought to the attention of the application engineers. Since they know their application best and they have the people to do it, they may decide (Decisions 330-340 of FIG. 3) to recode their application, to provide remote administration, accessible through the Internet with the same security functions they implemented for user application access.

Returning to Block 310, "multi-tenancy" is another desirable application attribute. The application architects proceed to read through the description and answer questions for this attribute. After reading the description, the architects are convinced that the application needs to be transformed to support multiple customers, with a single instance of the application. They also learn that being able to support multiple customers in a single install-instance will save money in terms of what they have to pay for in hardware and support maintenance. Consider the following example questions and answers:

Multi-Tenancy and Data Separation

Q: Does the application allow multiple companies to use it in a shared manner? A: Yes X No Hierarchical Type Access Q: Does the application have a sense of a hierarchical type of access that prevents unauthorized access to any part of the application by any type of user that does not have such access rights? A: Yes X No Data Separation Q: Does the database implementation of the application separate data of one company from another? A: Yes X No Database Queries Q: Do you disallow direct queries to the database through database provided tools? A: Yes X No Database Tables Q: Does the application or database architecture allow managing of customer A's data without affecting customer B's data? A: Yes X No Stateful Sessions Q: Does the application implement safe and secure stateful sessions? A: Yes X No Versioning Policy Q: Does the application have a versioning policy? A: Yes X No Here is the explanation for the answers in the example above, concerning multi-tenancy and data separation. Since the application is designed to be a stand-alone enterprise solution, nothing in the design allows it to be used by multiple companies at the same time. So all of the questions are answered as "No." (Concerning some other attribute, the "Yes" branch may be taken from Decision 320, to end at "attribute ready," Block 321 of FIG. 3, but not in this case.)

The architect may proceed with Decision 330 through Block 354 of FIG. 3, after answering the questions for this multi-tenancy attribute (at Decision 320), or may continue to the next attribute (i.e. repeat Block 310-Decision 320). Decision 330 through Block 354 of FIG. 3 describes what to do next after answering the self-assessment questions for each attribute. It also describes the services IBM provides, in case the architects need external help to transform their application.

As FIG. 3 indicates, if the application is not ready as far as this multi-tenancy attribute is concerned, then the "No" branch is taken from Decision 320 to Decision 330. The architects decide at 330 whether this attribute needs to be implemented or not. If not, then the "No" branch is taken from Decision 330 to end at Block 331. If on the other hand this attribute is to be implemented, then the "Yes" branch is taken from Decision 330 to Decision 340.

The architects then decide whether Ideas2Concepts.com has enough experience and expertise to solve the problem. The architects may decide not to get help; then the "No" branch is taken from Decision 340 to end at Block 341. On the other hand, the architects may decide to get help. Then the "Yes" branch is taken from Decision 340 to one or more of Blocks 350 through 354. Each attribute may require architectural consulting (Block 350), or development consulting (Block 352), or any of the other services represented by Block 350 through Block 354 of FIG. 3. These may be provided by IBM, for example. Below are details of some kinds of help that may be chosen at Decision 340.

Architectural consulting (Block 350)

Infrastructure architecture consulting—identifying the infrastructure footprint of the application Application architecture consulting—identifying the architecture of application partitioning Deployment unit consulting—placement of the deployment units on the infrastructure nodes Application Enablement Program (AEP) consulting (Block 351):—this represents consulting targeted for Independent Software Vendors (ISV's) who require software products related to consulting, porting, or migration. For example, IBM products involved here may include but are not limited to the software products sold under the trademarks WEBSPHERE, DB2, and MQSERIES, by IBM.

Development consulting (Block 352):
    provide necessary development tools such as Integrated Development Environments (IDE's)
    educate concerning Web Service Architectures such as SOAP, WSDL, and UDDI
    educate concerning Service Oriented Architecture (SOA)
    how to use the Service Programming Interface (SPI), the interface to IBM's Utility Management Infrastructure (UMI).UMI function with exposed SPI interfaces
    how to utilize UMI application framework and common services
    identify modules in the application where the SPI needs to be integrated
    Convert application to SOA using Web Services if necessary
Hosting consulting (Block 353)
    backup/restore strategy, recovery strategy
    application packaging changes for auto-provisioning (application provisioning)
    creation of any needed configuration files with accompanying instructions
    provide remote access and administration tools and educate on how to use them.
Others (Block 354):—this represents future consulting methodologies that develop as a result of Independent Software Vendor engagements, or experience gained through utilizing the method illustrated in FIG. 3.

Technology education (Block 355):—this represents education concerning Web Services technologies such as SOAP, WSDL, and UDDI, for example.

Regarding FIGS. 2-3, the order of the operations described above may be varied. For example, it is within the practice of the invention to repeat Block 310-Decision 320 for the next attribute, before reaching Decision 330. Blocks in FIGS. 2-3 could be arranged in a somewhat different order, but still describe the invention. Blocks could be added to the above-mentioned diagrams to describe details, or optional features; some blocks could be subtracted to show a simplified example.

FIG. 4 illustrates an example of a checklist, containing attributes for Stage 1. Stage 1 Checklist 400 has Rows 401-406, corresponding to ODS Attributes (Stage 1). Below is a list of Stage 1 attributes shown in FIG. 4:
Row 401 suitability for hosting
Row 402 use of on-demand center
Row 403 packaged for auto-provisioning
Row 404 multi-tenancy
Row 405 software maintenance and upgrade policy
Row 406 application scalability.

Stage 1 Checklist 400 has Columns 407-412, corresponding to kinds of help (also described above, in connection with FIG. 3):
Column 407, architectural consulting;
Column 408, development consulting;
Column 409, hosting consulting;
Column 410, application enablement program (AEP) consulting;
Column 411, technology education;
Column 412, other kinds of help.

After deciding which help is needed for an attribute, the architect marks an "X" on the checklist provided for Stage 1. For example, for the multi-tenancy attribute, Row 404, it is decided that architectural consulting help, Column 407, is needed. The architect marks an "X" in the box where Row 404 and Column 407 intersect. By the time the architect finishes answering all questions and marking X's on the grid, he will have a clear understanding on what needs to be done to the application. The following are examples of assessment questions for ODS Attributes (Stage 1).

Row 401 corresponds to suitability for hosting. Assessment questions for this desirable application attribute may be presented to a user, along with a description of the attribute, as in the following example.

DESCRIPTION OF THE ATTRIBUTE: The suitability or amenability of an application to be hosted is the minimum requirement for hosting on any IBM hosting center. Simply put, satisfying this requirement creates the basis for administrating the application either remotely by the application owner or locally by IBM system administrators within the hosting center, and for keeping critical data backed-up and safe in case of a catastrophic failure. It ensures that the application has the necessary support structure to allow it to serve its purpose with minimum interruptions to its users.

TABLE 1

Suitability for hosting: Example self-assessment questions

| DESCRIPTIONS AND QUESTIONS: | ANSWERS: | |
| --- | --- | --- |
| | YES | NO |
| 1.1 File Backup: Certain business data must be protected in case of storage failure or erroneous modification (user error). Logs or journals might have to be backed up to satisfy legal or business requirements. The application owner is charged for the amount of data that is transferred or stored. Can you identify critical files that need to be backed up? | | |
| 1.2 Remote Administration: The hosting center allows encrypted connections to pass through to a customer designated machine by using a Virtual Private Network. With the VPN connection the application owner can administer the application remotely. The application could also provide administrative functions using a browser (completely web enabled). Can the application be remotely administered? | | |
| 1.3 Browser Interface: Browsers provide a universal and flexible access interface to web based applications. Besides that benefit, it eliminates development support for multiple desktops. Is the application access through a browser interface? | | |
| 1.4 Access to legacy applications: Some applications may need to have access to legacy data and applications. Does the application provide a way to integrate with legacy data and applications if needed? | | |
| 1.5 Security for Internet: Does the application have enough security to be delivered on the Internet? | | |
| Check One: __READY __ALMOST READY __NOT READY | | |

Row 402 of FIG. 4 corresponds to Use of on-demand infrastructure. Assessment questions for this desirable application attribute may be presented to a user, along with a description of the attribute, as in the following example.

DESCRIPTION OF THE ATTRIBUTE: Two main hosting infrastructure models are offered in the IBM hosting centers. The first is the traditional Universal Server Farm Version 5 (USF V5) hosting center and the second is the On Demand Center (ODC). Understanding both infrastructure models and their capability are essential for deciding where best to board an ISV application. USF V5 infrastructure caters to customers who would rather own their own dedicated servers and run dedicated/sell-as-a-license type applications. The ODC caters to customers who prefer to run their applications in a shared utility infrastructure. Resources such as CPU, storage, and network are provided in a utility-like manner. The applications they run may also have some characteristics of being a utility.

TABLE 2

Use of on-demand center: Example self-assessment questions

| DESCRIPTIONS AND QUESTIONS: | ANSWERS: | |
|---|---|---|
| | YES | NO |
| 2.1 Use of USF V5: Will the application be boarded on USF V5? | | |
| 2.2 Use of ODC: Will the application be boarded on ODC? | | |
| Check One: __READY __ALMOST READY __NOT READY | | |

Row 403 of FIG. 4 corresponds to packaging for auto-provisioning. Assessment questions for this desirable application attribute may be presented to a user, along with a description of the attribute, as in the following example.

DESCRIPTION OF THE ATTRIBUTE: Auto-provisioning is part of UMI's infrastructure. It allows the infrastructure needs of the application to shrink and grow as needed. Mutual cooperation between the application and the infrastructure is needed to ensure successful auto-provisioning.

TABLE 3

Packaged for auto-provisioning: Example self-assessment questions

| DESCRIPTIONS AND QUESTIONS: | ANSWERS: | |
|---|---|---|
| | YES | NO |
| 3.1 Unattended Installation: To support auto-provisioning, the application must be "packageable" to provide unattended installation. For example, a Windows 2000 application can use InstallShield with the necessary response files. An AIX or Linux application can be packaged with the necessary scripts to un-tar the install images and place them in the appropriate directories. Post-installation customization and configuration must also be packaged, or kept to an absolute minimum. Can the application be packaged for unattended installation? | | |
| 3.2 Installation tool: The specific version of the installation tool (i.e., InstallShield) must be supported by the target operating system on which it will run. Has the version of the installation tool been tested on the operating system platform it will run on for both install and uninstall operations? | | |
| 3.3 Post Installation: Post installation activities might consist of creating database schemas and populating the tables, configuring user profiles, or tailoring other specific application parameters. The post-installation process should be as automated as possible. | | |

TABLE 3-continued

Packaged for auto-provisioning: Example self-assessment questions

| DESCRIPTIONS AND QUESTIONS: | ANSWERS: | |
|---|---|---|
| | YES | NO |
| Can the post-installation process be automated or scripted to support autoprovisioning? | | |
| 3.4 De-installation of application or its components: De-installation of an application may be required. If the application takes advantage of a newly auto-provisioned resource like a new server, it may need to save some configuration or user files before the resource is taken away by "reverse auto-provisioning" (shrinking of resources because utilization of the resource goes below a threshold). Note that the ODC reformats disk drives for reuse. This ensures that no customer data is left on the disk before the disk is reused by another customer. Does the application have de-installation capabilities? | | |
| Check One: __READY __ALMOST READY __NOT READY | | |

Row 404 of FIG. 4 corresponds to Multi-tenancy. Assessment questions for this desirable application attribute may be presented to a user, along with a description of the attribute, as in the following example.

DESCRIPTION OF THE ATTRIBUTE: A multi-tenant application can share one application instance amongst several businesses or enterprise customers. The one-to-one, single tenant application is mostly sold as a stand-alone application. It is installed in a dedicated hosting center or in the customer premises and is used within the enterprise. A multi-tenant, one-to-many application needs a more robust level of security and requires more isolation, but is able to be shared among multiple companies. Multi-tenancy is a desirable property in on demand application because it can offer significant cost savings on license fees as well as infrastructure and support cost.

TABLE 4

Multi-tenancy: Example self-assessment questions

| DESCRIPTIONS AND QUESTIONS: | ANSWERS: | |
|---|---|---|
| | YES | NO |
| 4.1 Multi-tenant and data separation: Will the application support multiple companies (or organizations, or enterprise customers) in a single installation instance? | | |
| 4.2 Hierarchical type access: A multi-tenant application should have a hierarchical access structure to prevent a user from accessing a part of the application to which they are not authorized. For example: End user access (lowest level access) Organization Administrator access (medium level) Application Administrator access (top level or super user) Does the application have a hierarchical access structure? | | |

TABLE 4-continued

Multi-tenancy: Example self-assessment questions

|  | ANSWERS: | |
|---|---|---|
| DESCRIPTIONS AND QUESTIONS: | YES | NO |
| 4.3 Data separation: The application or database implementation should not allow any type of user of one company to view, query, backup or restore data belonging to another company. Do the application and database implementations keep the data of one company separate from another? | | |
| 4.4 Database queries: A multi-tenant application should not permit a customer to use a database query tool to see data belonging to another customer. Does the application prevent the use of direct queries to the database through database provided tools? | | |
| 4.5 Database tables: An application could implement multi-tenancy by keeping all of its enterprise customer's data in one big database table. In this case, if there were no tools or application support to separate the data of one customer from another during a backup, then it may be impossible to restore a given customer's data without affecting other customers. Does the application or database architecture allow managing of customer A's data without affecting customer B's data? | | |
| 4.6 Stateful sessions: An application could use session tokens or cookies to track a user session. These tokens or cookies may remain persistent on the client or server machine. The application should securely terminate the session by invalidating tokens or cookies so it cannot be re-used to inadvertently grant access to unauthorized users Does the application implement safe and secure stateful sessions? Check One: __READY __ALMOST READY __NOT READY | | |

Row 405 of FIG. 4 corresponds to Software Maintenance. Assessment questions for this desirable application attribute may be presented to a user, along with a description of the attribute, as in the following example.

DESCRIPTION OF THE ATTRIBUTE: Applying maintenance, upgrades, and fixes to an application in a shared environment has more risk than when the application is not shared. Upgrading the application to a newer level or installing a software fix is "business as usual" in a dedicated (non-shared) environment. But in a shared application environment some additional steps may have to be in place because each company sharing the application may have varying levels of expectations of application availability. An inadequate or non-existent policy plan for software maintenance and upgrades can bring widespread customer dissatisfaction due to corrupted or bad data caused by a bug or flaw in the application.

TABLE 5

Software Maintenance and Upgrade Policy: Example self-assessment questions

|  | ANSWERS: | |
|---|---|---|
| DESCRIPTIONS AND QUESTIONS: | YES | NO |
| 5.1 Upgrade and bug fix policy: Do you have a policy in place for maintaining and upgrading your application and environment? If you do not have a policy, skip the rest of the questions. | | |
| 5.2 Contingency plan: Does your policy include how to backout a fix or an upgrade? | | |
| 5.3 Staging (Pre-production) environment: Does the policy include procedures to have the upgrade or the fix tested in a staging (pre-production) environment in the utility hosting center? | | |
| 5.4 Customer notification: Does the policy include notifying the customers as well as IBM's infrastructure support personnel (if needed) in a timely fashion? | | |
| 5.5 Third party product upgrades: Does the policy include procedures on upgrading or applying maintenance to third party products used by the shared application? | | |
| 5.6 Policy to SLA relationship: Does your policy track closely to Service Level Agreements presented to the customer? Check One: __READY __ALMOST READY __NOT READY | | |

Row 406 of FIG. 4 corresponds to Application Scalability. Assessment questions for this desirable application attribute may be presented to a user, along with a description of the attribute, as in the following example.

DESCRIPTION OF THE ATTRIBUTE: Scalability is an application attribute that describes the variability of user response time when a fixed amount of resources are added to support a linearly increasing set of users. Resources can be hardware in terms of CPU or memory while software resource can be in the form of another application server or database instance. The extra resource is added to support increasing amount of users so that response time does not get impacted. Horizontal scalability is defined as the ability to add application or middleware instances and/or servers when demand rises. Vertical scaling is defined as the ability to use features provided by the infrastructure, such as single sign-on, directory services or digital certificate services as needed to handle diverse business demand.

TABLE 6

Application Scalability: Example self-assessment questions

|  | ANSWERS: | |
|---|---|---|
| DESCRIPTIONS AND QUESTIONS: | YES | NO |
| 6.1 Scaling in all tiers: Is the application multi-tiered and does it allow additional resources be put in place in any tier without affecting other tiers? | | |
| 6.2 Load balancing: Does the application have internal or external load-balancing capabilities? | | |

TABLE 6-continued

Application Scalability: Example self-assessment questions

| DESCRIPTIONS AND QUESTIONS: | ANSWERS: | |
|---|---|---|
| | YES | NO |
| 6.3 Peak demand policy: A utility application should have a means of preventing degradation of service due to peak demand usage. CPU monitors can send alerts to systems administrators, who could initiate provisioning additional resources when necessary. Does the application have a policy to provision for peak demand such that it prevents the degradation of quality of service? | | |
| 6.4 Capacity planning guide: Does the application provide a hardware capacity planning guide based on performance or statistical models? | | |
| 6.5 Hosting benchmarks: A capacity planning guide should be supported by benchmark data in a hosting environment. Has the application ever been benchmarked while running in a hosting environment? Check One: __READY __ALMOST READY __NOT READY | | |

FIG. 5 illustrates an example of a checklist, containing attributes for Stage 2. Stage 2 Checklist 500 has Rows 501-508, corresponding to ODS Attributes (Stage 2). Below is a list of Stage 2 attributes shown in FIG. 5:

Row 501 Application metering capability
Row 502 application billing service
Row 503 Portal
Row 504 user provisioning services
Row 505 application provisioning service
Row 506 customer care
Row 507 service oriented architecture (SOA) based on web services
Row 508 use of virtualized resources.

The architect answers questions and marks X's on the grid. The following are examples of assessment questions for ODS Attributes (Stage 2). Row 501 corresponds to Application metering capability. Assessment questions for this desirable application attribute may be presented to a user, along with a description of the attribute, as in the following example.

DESCRIPTION OF THE ATTRIBUTE: Metering capability allows an application to monitor usage. Certain parts of the application can be monitored to produce usage and profiling information. Usage information can be fed to a billing system to bill subscribers for usage of the application at a more granular level. Profiling information can give the application owner information that can used to improve quality, performance and features of a particular part of the application.

TABLE 7

Application metering capability:
Example self-assessment questions

| DESCRIPTIONS AND QUESTIONS: | ANSWERS: | |
|---|---|---|
| | YES | NO |
| 7.1 Metering capability: Does the application owner wish to include a metering capability? Skip the rest of the questions if the answer is NO. | | |

TABLE 7-continued

Application metering capability:
Example self-assessment questions

| DESCRIPTIONS AND QUESTIONS: | ANSWERS: | |
|---|---|---|
| | YES | NO |
| 7.2 Relevance of metering data: When including metering capability one of the things to think about is what to meter and is that metered data relevant to the billing model. Is the metering data relevant to the overall billing model? | | |
| 7.3 Interface to metering service: Can the application communicate through web services to interact with IBM's metering service? Check One: __READY __ALMOST READY __NOT READY | | |

Row 502 of FIG. 5 corresponds to Application Billing Service. Assessment questions for this desirable application attribute may be presented to a user, along with a description of the attribute, as in the following example.

DESCRIPTION OF THE ATTRIBUTE: The simplest strategy for billing in a shared application environment is to charge a subscriber a set monthly fee. For the most part this monthly fee may have been derived through some empirical means multiplied by some coefficient factor to make sure the application owner profits from the whole operation. While this billing strategy works most of the time, it leaves a lot to be desired. Although all subscribers may pay the same monthly rate, some may be using more resources than others. This can lead some subscribers to inadvertently abuse the application to the detriment of other subscribers. Billing for application or service usage is the recommended way of operating as an ODS. This together with the metering attribute mentioned previously enables the application owner the ability to bill accordingly. Even if the application owner does not make a choice to bill for application usage it may still be beneficial to use a billing service because it can offer more specialized expertise in the billing arena than what the application owner has in-house. This leaves the application owner the ability to focus more on its core competency. The questions that follow bring to the attention of application owners some thoughts on why an application billing service may be important to their application. If the application owner does not wish to have a billing service, please skip to the next attribute.

TABLE 8

Application Billing Service: Example self-assessment questions

| DESCRIPTIONS AND QUESTIONS: | ANSWERS: | |
|---|---|---|
| | YES | NO |
| 8.1 Billing functionality: Does the application owner wish to include a billing functionality in their product? Skip the rest of the questions if the answer is NO. | | |
| 8.2 Pricing Structure: An application may offer several levels of functionalities. An application owner may wish to charge differently for the different functionalities as well as its levels. A billing application may help in this situation. | | |

TABLE 8-continued

Application Billing Service: Example self-assessment questions

| DESCRIPTIONS AND QUESTIONS: | ANSWERS: | |
|---|---|---|
| | YES | NO |
| Does the application need the capability to offer different pricing structures for varying use of the application? | | |
| 8.3 Rating: An application owner may wish to rate its subscribers according to their use of a function. This could lead to discounts being given to certain groups of target customers. Does the application have rating capabilities? | | |
| 8.4 Invoicing: A billing service can also include invoicing a customer for different services used in a timely fashion. This may also be tied to some form of a portal for customers to view their monthly statement. Does the application have customer-invoicing capabilities? | | |
| Check One: __READY __ALMOST READY __NOT READY | | |

Row 503 of FIG. 5 corresponds to Portal. Assessment questions for this desirable application attribute may be presented to a user, along with a description of the attribute, as in the following example.

DESCRIPTION OF THE ATTRIBUTE: This attribute concerns the application's adaptability to be integrated into a community portal where the users or administrator of the applications can log on, discover relevant services to which they are entitled, access the application or view the application/service usage and billing information.

TABLE 9

Portal: Example self-assessment questions

| DESCRIPTIONS AND QUESTIONS: | ANSWERS: | |
|---|---|---|
| | YES | NO |
| 9.1 User profile views: Users and administrators need to have access to their own account views of usage, billing and profile. Does the application have a web-based portal that allows users to view and manage their accounts profiles? | | |
| 9.2 Customized views: Different subscribers will have different needs for viewing and accessing user account and information. Does the application allow subscribers to customize or personalize their view of the front facing web page for the application? | | |
| 9.3 Branding: Different enterprise companies may wish to display their own company logos for their users. Does the front facing web page of the application provide re-branding capability for enterprise customers? | | |
| Check One: __READY __ALMOST READY __NOT READY | | |

Row 504 of FIG. 5 corresponds to User Provisioning Services. Assessment questions for this desirable application attribute may be presented to a user, along with a description of the attribute, as in the following example.

DESCRIPTION OF THE ATTRIBUTE: One of the goals of the IBM utility hosting environment is to present a universal, user-friendly environment to subscribers as well as administrators. Subscribers are given the ability to self-manage and view their accounts and passwords after enrolling while administrators are given the authority to do administrative functions for the company they administer for. Offering such capabilities transfer some of the administrative burden from the ISV to its customers which can lower user and management cost and deliver value to their customers. Here are some other application provisioning functionalities:

Ability to delegate a hierarchy of user administrators to administer the application.
Ability to subscribe an organization to use the application.
Ability to create secure administration domains so that no un-authorized personnel can access other organizational domains they should not have access to.
Ability to store user password and profile information for users.
Ability to grant and restrict subscribers to their respective entitlements.
Ability to enforce user password policies.
Ability to authenticate and authorize subscribers on a single sign-on basis.
Ability to grant or restrict access to subscribers depending on time of day, priority or business functions.
Ability to grant or restrict access to different modules of the application.
Ability to log information for user administration needs.

TABLE 10

User Provisioning Services: Example self-assessment questions

| DESCRIPTIONS AND QUESTIONS: | ANSWERS: | |
|---|---|---|
| | YES | NO |
| 10.1 Functional Capabilities: Does your application wish to have some or all of the capabilities mentioned above? | | |
| Check One: __READY __ALMOST READY __NOT READY | | |

Row 505 of FIG. 5 corresponds to Application Provisioning Service. Assessment questions for this desirable application attribute may be presented to a user, along with a description of the attribute, as in the following example.

DESCRIPTION OF THE ATTRIBUTE: Automatic provisioning for needed resources is a function offered by the application provisioning service. It communicates with the hosted ISV application to determine if there are adequate resources for new application users. Other capabilities include the following:

It allows for the creation of a new instance of an application.
Configure access control for the application instance.
Initiate request to add user specific parameters to the ISV application.
Grant application access.
Log all activities.

TABLE 11

Application Provisioning Service: Example self-assessment questions

| DESCRIPTIONS AND QUESTIONS: | ANSWERS: | |
|---|---|---|
| | YES | NO |
| 11.1 Functional Capabilities: Does your application wish to have some or all of the capabilities mentioned above? | | |

TABLE 11-continued

Application Provisioning Service: Example self-assessment questions

| DESCRIPTIONS AND QUESTIONS: | ANSWERS: YES | NO |
|---|---|---|
| Check One: __READY __ALMOST READY __NOT READY | | |

Row 506 of FIG. 5 corresponds to Customer Care. Assessment questions for this desirable application attribute may be presented to a user, along with a description of the attribute, as in the following example.

DESCRIPTION OF THE ATTRIBUTE: Application help and support are functions needed by any software provider. IBM offers this service as a means for subscribers to report, view and track reported problems.

TABLE 12

Customer Care: Example self-assessment questions

| DESCRIPTIONS AND QUESTIONS: | ANSWERS: YES | NO |
|---|---|---|
| 12.1 Does your application have a customer care service? Check One: __READY __ALMOST READY __NOT READY | | |

Row 507 of FIG. 5 corresponds to Service Oriented Architecture (SOA) based on Web services. Assessment questions for this desirable application attribute may be presented to a user, along with a description of the attribute, as in the following example.

DESCRIPTION OF THE ATTRIBUTE: If the application owner does not have plans is to be a subscriber or provider of any services within the infrastructure, please proceed to the next attribute. Subscriber of Services If your application will not use UMI functions or communicate with external common services, skip this section. An application wishing to communicate with the UMI or external common services offered within the infrastructure will have to do so using Web services technology. This includes the use of XML, SOAP and UDDI.

TABLE 13

Service Oriented Architecture (SOA) based on Web services: Example self-assessment questions

| DESCRIPTIONS AND QUESTIONS: | ANSWERS: YES | NO |
|---|---|---|
| 13.1 Interfacing to UMI: Is the application capable of communicating to the UMI using web services technology? 13.2 Interfacing with Common services: Is your application capable of communicating with external common services using web services technology? 13.3 External Web Services interface: Has the application been tested to communicate with external web services? Provider of Services: If your application will not be a provider to other on-demand services, skip this section. Transforming an application to become an ODS may include exposing any of its | | |

TABLE 13-continued

Service Oriented Architecture (SOA) based on Web services: Example self-assessment questions

| DESCRIPTIONS AND QUESTIONS: | ANSWERS: YES | NO |
|---|---|---|
| functionality for use by other applications on a subscription basis. This requires the application to adhere to the basic premise of services oriented architecture. 13.4 Web Services functions: Does your application plan to expose any of its functionalities as web services? 13.5 UMI testing: Have the web services exposed by the application ever been tested in a UMI environment? 13.6 UDDI repository: Does your application publish its services in a UDDI repository? Check One: __READY __ALMOST READY __NOT READY | | |

Row 508 of FIG. 5 corresponds to use of virtualized resources. Assessment questions for this desirable application attribute may be presented to a user, along with a description of the attribute, as in the following example.

DESCRIPTION OF THE ATTRIBUTE: Virtualization is a technology used in the on demand environment to respond to demand for server, storage, and network resources. The ISV's application must not have any hardware or platform-specific dependencies to be able to use virtual services. We consider Linux on zSeries and VMware on xSeries architecture as the type of virtual resource technologies most ISV applications will be running on. Grid computing will be added to the assessment when the technology matures and is available in the utility hosting infrastructure.

TABLE 14

Use or virtualized resources: Example self-assessment questions

| DESCRIPTIONS AND QUESTIONS: | ANSWERS: YES | NO |
|---|---|---|
| 14.1 Hardware dependency: If the application code does not have any dependencies on underlying hardware implementation, the answer here is yes. Does the application use any application extensions or functions that depend on the underlying hardware? 14.2 Testing on virtualized environment: If the application runs on a Windows environment and it has been successfully tested on a virtual environment like VMware, then the answer here is yes. Has the application ever been run on a virtualized environment? 14.3 Benchmarking: If the application has been run in a virtualized environment within a hosting facility and the application owner has data that helps in the creation of a capacity planning guide, then the answer here is yes. Has the application ever been benchmarked in a virtualized environment within a hosting facility? Check One: __READY __ALMOST READY __NOT READY | | |

Stage 2 Checklist 500 has Columns 509-514, corresponding to kinds of help (also described above, in connection with FIG. 3):

Column 509, architectural consulting;
Column 510, development consulting;
Column 511, hosting consulting;
Column 512, application enablement program (AEP) consulting;
Column 513, technology education;
Column 514, other kinds of help.

FIG. 6 illustrates an example of a checklist, containing attributes for Stage 3. Stage 3 Checklist 600 has Rows 601-608, corresponding to ODS Attributes (Stage 3). The architect answers questions and marks X's on the grid. The following are examples is of assessment questions for ODS Attributes (Stage 3). Row 601 corresponds to Single sign-on. Assessment questions for this desirable application attribute may be presented to a user, along with a description of the attribute, as in the following example.

DESCRIPTION OF THE ATTRIBUTE: Sometimes an application may offer different services within itself and access to it may require subscribers to login more than once. Single sign-on capability alleviates the task of multiple sign-ons.

TABLE 15

Single sign-on: Example self-assessment questions

| DESCRIPTIONS AND QUESTIONS: | ANSWERS: | |
|---|---|---|
| | YES | NO |
| 15.1 Multiple logins: Does your application require multiple logins to access different parts of your application? | | |
| 15.2 Does your application have single sign-on capability? | | |
| If you answered yes to 15.1 and no to 15.2 above then your application may benefit from a single sign-on service from IBM. | | |
| Check One: __READY __ALMOST READY __NOT READY | | |

Row 602 corresponds to Application self monitoring. Assessment questions for this desirable application attribute may be presented to a user, along with a description of the attribute, as in the following example.

DESCRIPTION OF THE ATTRIBUTE: An application monitoring itself is akin to having its own autonomic abilities. The application may choose to monitor some key resources or application heuristics that it relies on to function correctly. If it senses that something is about to go awry or that a threshold is reached, the application may choose to write a message to a log file, send an alert to an SNMP agent, or perform some corrective actions to itself if necessary.

TABLE 16

Application self monitoring: Example self-assessment questions

| DESCRIPTIONS AND QUESTIONS: | ANSWERS: | |
|---|---|---|
| | YES | NO |
| 16.1 Alerts: Does your application send out alerts to administrators when your application needs attention? | | |
| 16.2 Thresholds: Does your application monitor certain thresholds of resources | | |

TABLE 16-continued

Application self monitoring: Example self-assessment questions

| DESCRIPTIONS AND QUESTIONS: | ANSWERS: | |
|---|---|---|
| | YES | NO |
| or application usage to send an alert to administrators? | | |
| 16.3 Data/Transmission Integrity: Several Internet protocols offer stateless transmission of data. Data transmitted can get lost without anyone knowing about it until it is too late. Are there areas in your application that rely in stateless and asynchronous data transfers? | | |
| If yes, do you have ways to assure data is not lost? | | |
| 16.4 Autonomic behavior: Does your application use some heuristics to self-monitor and correct itself when needed? | | |
| Check One: __READY __ALMOST READY __NOT READY | | |

Below is a list of other Stage 3 attributes shown in FIG. 6:
Row 603 License agreements
Row 604 Service Level Agreements (SLA)
Row 605 Trial subscriptions
Row 606 Resource provisioning
Row 607 User/Enterprise qualification (credit check, valid legal entity)
Row 608 Offer catalog (UDDI, web applications, non-exclusive rights to a given function)

Below are examples of other Stage 3 attributes, not shown in FIG. 6:
Ordering (via sales force, via web site)
Integration with other applications.

Stage 3 Checklist 600 has Columns 609-614, corresponding to kinds of help (also described above, in connection with FIG. 3):

Column 609, architectural consulting;
Column 610, development consulting;
Column 611, hosting consulting;
Column 612, application enablement program (AEP) consulting;
Column 613, technology education;
Column 614, other kinds of help.

Figure 7:
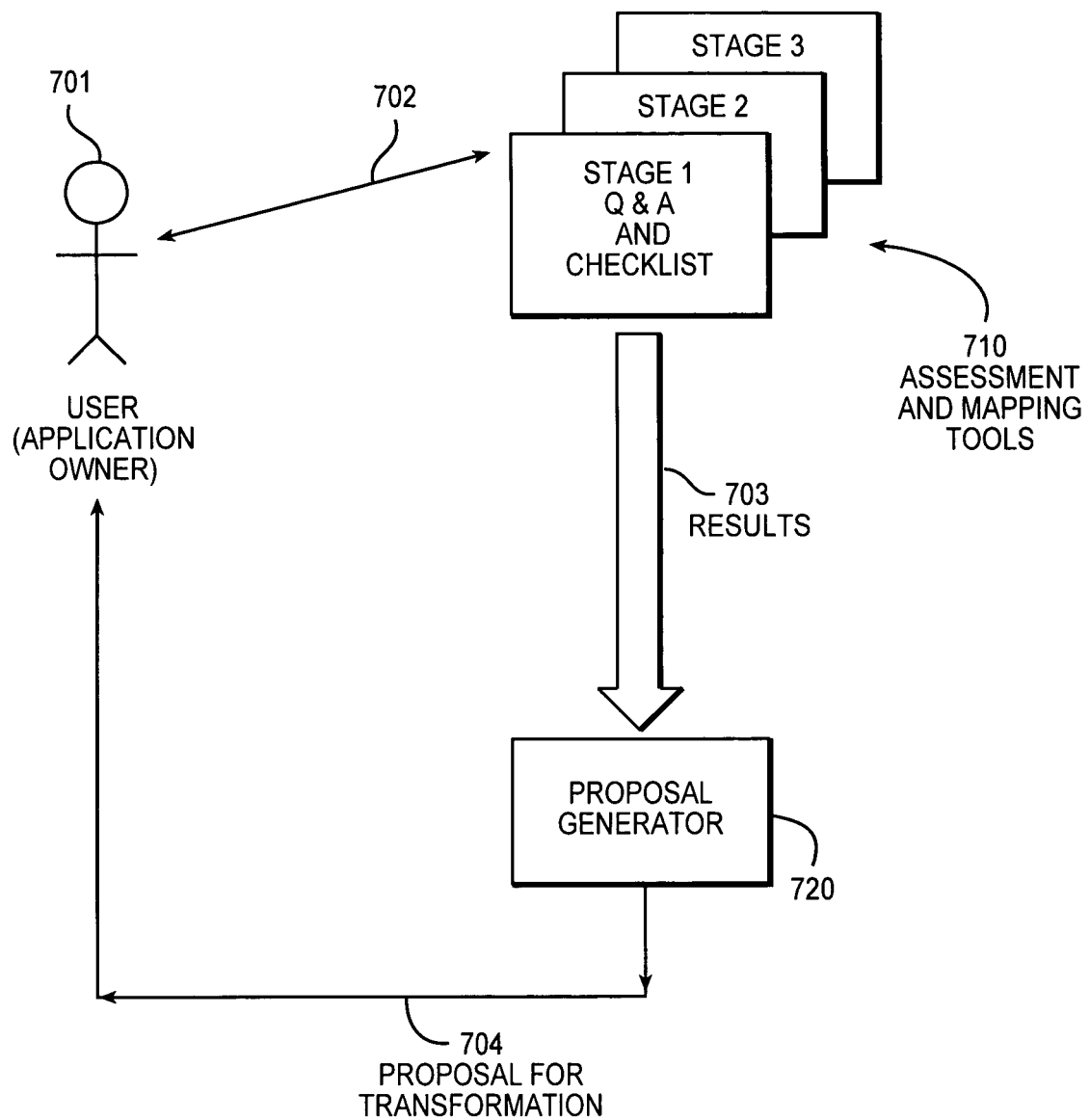
FIG. 7 is a block diagram, illustrating an example of a method and system of transforming an application.

FIG. 7 is a block diagram, illustrating an example of a method and system of transforming an application. The example begins with providing a set of desirable application attributes, through assessment and mapping tools 710. The example involves a user 701 choosing (702) a desirable application attribute from the set, assessing readiness for transformation, planning development work, and repeating these steps for a number of desirable application attributes chosen from the set. The example involves a user 701 and the system executing this iterative process. The example continues with generating a proposal for transformation (704), based on results (703) of the process.

Assessment and mapping tools 710 serve as means for assessing readiness for transformation, based on a number of desirable application attributes, and means for planning development work. This planning preferably involves mapping at least some of the desirable application attributes to at least some kinds of help.

Generator 720 serves as means for generating a proposal for transformation, based on results 703 produced by assessment and mapping tools 710; and means for outputting the proposal 704.

Assessment and mapping tools 710 may be implemented at least in part with software running on a computer, or with printed instructions or a printed paper form, used with pencil, for example. The double-headed arrow 702, connecting user 701 with assessment and mapping tools 710, symbolizes interactions between user 701 and assessment and mapping tools 710. For example, assessment and mapping tools 710 may give output to, and receive input from, user 701. Input devices such as keyboard, mouse, touch-sensitive screen, or microphone may be used. Inputs may come directly from user 701, or from another source, such as stored data.

The system in FIG. 7 may be implemented as a consulting tool, for example. An automated consulting tool may utilize interactive assessment and mapping tools (710) to produce a consulting proposal 704 for transformation. Assessment and mapping tools 710 may be implemented with assessment questions and checklists, similar to Tables 1-16 and FIGS. 4-6. These may be presented to user 701 on printed pages or via a computer monitor. The system in FIG. 7 may be implemented with software capable of running on a desktop computer or laptop computer. It may have a familiar, spreadsheet-style user interface, and may be built on spreadsheet software, for example. Other hardware and software could be used. The system in FIG. 7 could be implemented by using object-oriented programming with the JAVA programming language and database-management software, for example. The system in FIG. 7 could be implemented as a client-server application for example.

Another possibility would be to implement it as a web application (i.e., a computer application executable over an intranet or the Internet).

Turning now to details of proposal 704, proposal 704 may represent a detailed plan to guide the development work involved in transforming an application into an ODS. The following is a description of means for performing a transformation, based on the proposal, and means for deploying an on-demand service. For example, an ISV's application may be integrated into IBM's utility hosting center. This requires both application and infrastructure architectures to become one. This means the application does not have to operate on the hosting architecture as an entity by itself anymore. It will run as a pseudo intelligent application that can interact with the utility infrastructure as well as other applications if it chooses to. The utility infrastructure provides a wide range of services that the application can take advantage of which alleviates the need for application owners to develop these functionalities themselves. It is for this reason that hosting and application architects need to work together to get the application ready to use the Service Programming Interface (SPI). The SPI is the sole interface to IBM's Utility Management Infrastructure (UMI). Through the use of the SPI, the ODS will be able to use functionalities that the UMI offers. The following are examples of SPI functionalities that are available for use by the application. The Send Metering Data SPI provides the application owner an SPI to send application-metered data to a repository within the UMI. This serves as a repository for metered data that the application can later get and use for other purposes. The Get Meter Data SPI provides the application owner an SPI to get application-metered data stored in UMI through the "send metering data" SPI. The application owner will be allowed to specify a set of criteria, which can limit the scope of the metered data returned to the application. The metered data returned can then be processed by the application for its use. A typical use of metered data is for billing purposes. Upon receiving the metered data the application can pass it on to a billing service, which processes the data and takes care of billing individual subscribers on behalf of the application owner. The Monitor Notification SPI provides the application owner an SPI to send notifications via email or page. The application owner may have already implemented a self-monitoring capability which logs application events to a file. This SPI provides a way to extend that capability such that someone is notified of some event within the application. It may prove useful for preventing application outages. Application problems can be eliminated by some preventative measure done after such notification. The Monitor Service Event SPI provides the application owner an SPI to send a service event to the UMI, which will then be reflected on a Tivoli Event Console, alerting a technician to a potential loss of service capability of the application. The only difference between this and the previous SPI is the medium for delivery of the notification.

Continuing with details of FIG. 7, proposal 704, and development work, several tools exist that can help an ISV with development work involved in transforming their application into an ODS. Here are a few examples of tools available from IBM. WEBSPHERE Studio Application Developer (WSAD) is an Integrated Development Environment (IDE) to aid in creating, publishing and discovering Web services that are created from JavaBeans or Enterprise JavaBeans. It also allows the use of Web service tools to create a skeleton JavaBean and a sample application from a WSDL document. WEBSPHERE Software Development Kit (WSDK) is designed to address the needs of experienced Java programmers who want to quickly learn how Web services can be created using existing Java components and achieve seamless integration with disparate systems. Provides the tools necessary to create and test Web services in a tightly integrated package including a simplified Web application server, tools, documentation, demos, and sample applications. The Emerging Technologies Toolkit (ETTK) provides a run-time environment, as well as demos, examples, and additional tools to design and showcase emerging technologies. In addition, it provides introductory material for developers to easily get started with Autonomic, Web Service and Grid applications. By using the Toolkit, developers can get a solid understanding on how to create and deploy these technologies using open specifications such as SOAP, WSDL, Grid, and UDDI. More information about the WSDK can be found at IBM's alphaworks web site.

Open Source tools for web services development are available from the Apache Software Foundation. APACHE TOMCAT is an open source reference implementation of the Java Servlet and JavaServerPages technologies. APACHE AXIS is an open source implementation of SOAP (Simple Object Access Protocol).

MICROSOFT CORP. offers downloadable tools that help migrate existing applications to use the software products sold under the trademark .NET by MICROSOFT CORP. The NET framework includes tools to convert application functionalities to web services.

This final portion of the detailed description presents a few details of a working example implementation. This was a document entitled *ODS Workbook*. It was used as a consulting tool by IBM. It contained descriptions of ODS attributes, self-assessment questions, and checklists. The *ODS Workbook* provided the examples illustrated in Tables 1-16 and FIGS. 3-6.

In conclusion, we have shown examples of transforming an application into an on-demand service.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose is computer selectively activated or reconfigured by software, one of ordinary skill in the art would also recognize that such methods may be carried out in hardware, in firmware, or in more specialized apparatus constructed to perform the method.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A computer implemented method of transforming an application, said method comprising:
    assessing readiness for transformation, based on a plurality of desirable application attributes, wherein said assessing readiness for transformation further comprises:
        choosing one of said desirable application attributes; and
        determining a state of readiness for the chosen desirable application attribute;
        wherein said state of readiness may take on a value of ready; almost ready; or not ready;
    mapping at least some of said desirable application attributes to at least some kinds of help;
    generating a proposal for transformation, based on results of said assessing and said mapping;
    outputting said proposal;
    performing a transformation, based on said proposal; and
    deploying an on-demand service, based on said transformation.

2. The method of claim 1, wherein said assessing and said mapping may be performed for a plurality of transformation stages.

3. The method of claim 1, wherein said assessing readiness for transformation further comprises:
    providing assessment questions associated with said desirable application attributes; and
    receiving input in response to said questions;
    wherein said questions are designed to draw attention to transformation issues.

4. The method of claim 1, further comprising:
    determining whether the chosen desirable application attribute will be implemented; and if so, determining whether help is needed for implementing the chosen desirable application attribute.

5. The method of claim 1, further comprising:
    including in said proposal one or more kinds of help, chosen from:
    architectural consulting;
    development consulting;
    hosting consulting;
    application enablement program consulting; and
    technology education.

6. The method of claim 1, wherein said mapping further comprises:
    providing at least one checklist; and
    receiving input in response to said checklist.

7. The method of claim 1, wherein one or more of said desirable application attributes are chosen from:
    suitability for hosting;
    use of on-demand center;
    packaged for auto-provisioning;
    multi-tenancy software maintenance and upgrade policy; and
    application scalability.

8. The method of claim 1, wherein one or more of said desirable application attributes are chosen from:
    application metering capability;
    application billing service;
    portal;
    user provisioning services;
    application provisioning service;
    customer care;
    service oriented architecture based on web services; and
    use of virtualized resources.

9. The method of claim 1, wherein one or more of said desirable application attributes are chosen from:
    single sign-on;
    application self monitoring;
    license agreement;
    service level agreements;
    integration with other applications;
    user/enterprise qualification;
    trial subscriptions;
    resource provisioning; and
    offer catalog.

10. A computer implemented method of transforming an application, said method comprising:
    providing a set of desirable application attributes;
    providing descriptions of said desirable application attributes;
    providing assessment questions associated with said desirable application attributes;
    providing an iterative process including a-d below:
        (a) choosing a desirable application attribute from said set;
        (b) concerning said desirable application attribute, assessing readiness for transformation;
        (c) concerning said desirable application attribute, planning development work
        (d) repeating the above three steps for a plurality of desirable application attributes chosen from said set;

executing said iterative process;

generating a proposal for transformation, based on results of said iterative process;

outputting said proposal;

performing a transformation, based on said proposal; and deploying an on-demand service, based on said transformation.

11. The method of claim 10, further comprising:

mapping at least some of said desirable application attributes to at least some kinds of help.

12. The method of claim 10, wherein said executing, said generating and said outputting may be performed for one or more transformation stages chosen from:

a stage to be implemented upon deployment of an on-demand service;

a stage to be implemented approximately four to eight months after deploying said on-demand service; and a stage to be implemented approximately twelve months or more after deploying said on-demand service.

13. The method of claim 10, wherein said providing assessment questions further comprises providing one or more questions chosen from:

whether critical files that need to be backed up can be identified;

whether the application can be remotely administered; and whether the application has enough security to be delivered on the Internet.

14. The method of claim 12, wherein said providing assessment questions further comprises providing one or more questions chosen from:

whether the application allows multiple customers to use it in a shared manner;

whether the application has a hierarchical type of access;

whether the application's database implementation separates data of one customer from data of another customer;

whether direct queries to the application's database through database provided tools are disallowed;

whether the application or database architecture allows managing of a first customer's data without affecting a second customer's data;

whether the application implements safe and secure stateful sessions; and whether the application has a versioning policy.

* * * * *